(12) United States Patent
Page et al.

(10) Patent No.: US 7,437,560 B1
(45) Date of Patent: Oct. 14, 2008

(54) METHOD AND APPARATUS FOR ESTABLISHING A SECURE SMART CARD COMMUNICATION LINK THROUGH A COMMUNICATION NETWORK

(75) Inventors: Kevin J. Page, Del Mar, CA (US); Don P. Plum, San Diego, CA (US); Guy M. Kelly, La Jolla, CA (US); Joseph V J Ravenis, II, San Diego, CA (US); David R. Carta, Poway, CA (US)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 09/360,068

(22) Filed: Jul. 23, 1999

(51) Int. Cl.
 *H04L 9/00* (2006.01)
(52) U.S. Cl. .................. 713/176; 713/182; 713/184; 380/282
(58) Field of Classification Search .............. 713/153, 713/192–194, 172; 235/380, 382, 382.5, 235/492, 379; 705/44, 73, 76
See application file for complete search history.

(56) References Cited

U.S. PATENT DOCUMENTS

| | | | |
|---|---|---|---|
| 4,798,322 A | 1/1989 | Bernstein et al. | |
| 5,295,188 A * | 3/1994 | Wilson et al. | 380/30 |
| 5,347,580 A | 9/1994 | Molva et al. | |
| 5,414,772 A * | 5/1995 | Naccache et al. | 380/46 |
| 5,530,232 A | 6/1996 | Taylor | |
| 5,544,246 A | 8/1996 | Mandelbaum et al. | |
| 5,546,463 A | 8/1996 | Caputo et al. | |
| 5,623,637 A | 4/1997 | Jones et al. | |
| 5,664,157 A | 9/1997 | Takahira et al. | |
| 5,677,955 A * | 10/1997 | Doggett et al. | 705/76 |
| 5,714,741 A | 2/1998 | Pieterse et al. | |
| 5,727,230 A | 3/1998 | Fujioka | |
| 5,729,594 A | 3/1998 | Klingman | |
| 5,745,571 A * | 4/1998 | Zuk | 380/285 |
| 5,778,071 A | 7/1998 | Caputo et al. | |
| 5,847,447 A | 12/1998 | Rozin et al. | |
| 5,878,142 A | 3/1999 | Caputo et al. | |
| 6,101,477 A * | 8/2000 | Hohle et al. | 705/1 |
| 6,226,744 B1 * | 5/2001 | Murphy et al. | 713/200 |
| 6,304,223 B1 * | 10/2001 | Hilton et al. | 343/702 |

FOREIGN PATENT DOCUMENTS

| | | |
|---|---|---|
| EP | 0 690 399 A2 | 6/1995 |
| EP | 0 758 777 A2 | 7/1996 |
| EP | 0 924 667 A2 | 10/1998 |
| EP | 0924667 A2 | 6/1999 |
| WO | WO 91/14237 | 9/1991 |
| WO | WO 95/30975 | 11/1995 |
| WO | WO 97/10562 | 3/1997 |
| WO | WO 98/52151 | 11/1998 |

\* cited by examiner

*Primary Examiner*—Pramila Parthasarathy
(74) *Attorney, Agent, or Firm*—Townsend and Townsend and Crew LLP

(57) ABSTRACT

A secure communication link is established between a smart card and a remote central computer system through a network by using security functions at the smart card and the central computer system. A smart card communication device facilitates the exchange of data between the smart card and a local processor by modulating data signals sent from the local processor and demodulating signal transmitted from the smart card. The local processor couples the data signals to the network while maintaining the secure data in its secure state. The secure link can be used to perform a smart card transaction.

32 Claims, 7 Drawing Sheets

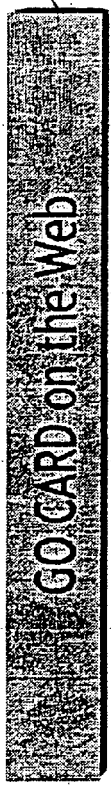
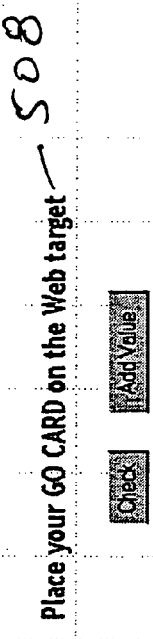
FIG. 5

METHOD AND APPARATUS FOR ESTABLISHING A SECURE SMART CARD COMMUNICATION LINK THROUGH A COMMUNICATION NETWORK

BACKGROUND OF THE INVENTION

1. Field of the Invention

The present invention relates generally to smart card systems and more specifically to a smart card system, device and method for providing a secure communication link between a remote central computer system and a smart card.

2. Background

The term "smart card" is typically used to refer to various types of devices having an embedded integrated circuit for storing information. The reference to "smart cards" within this disclosure includes both contact and non-contact cards (also referred to as proximity cards). Smart card communication devices are used to write information to the card and to read information from the card. Some smart card communication devices may only have the ability to read from or write to the smart card. Therefore, a smart card communication device may be a smart card reader, a smart card writer or both.

Typically, the smart card communication device is connected to a host computer that regulates transactions between the smart card and the smart card communication device. In some systems, however, the host computer may be part of the smart card communication device. Smart card systems may include any number of host computers and communication devices depending on the particular configuration and requirements of the system.

The smart card is a small, usually credit card shaped, device that contains at least a memory device for storing information and a transceiver to communicate with a smart card communication device. The smart card communication device communicates through the transceiver on the smart card to access the stored information. The smart card communication device may simply read the information, load the information into the memory device or modify existing data in the memory device. For example, if the owner of a smart card uses a smart card containing financial information to make a purchase, the smart card communication device can read the information including the owner's identity and the availability of funds. The smart card communication device can also deduct the purchase amount from the available funds if it has writing capabilities. Further, the communication device can store transaction data on the smart card including the time and location of the transaction in addition to the identity of the communication device.

Existing smart cards can be classified as either contact or non-contact smart cards. It is not necessary for non-contact smart cards (also referred to as proximity cards) to physically contact a smart card communication device to exchange data. Proximity cards typically employ modulated radio frequency (RF) field and impedance modulation techniques to transfer data between the proximity card and the proximity card communication device.

Smart cards have a variety of uses and can be utilized in any transaction that involves the exchange of data or information between individuals and an institution or between two or more individuals. For example, smart cards can be used to store information including medical records, financial information, vehicle maintenance information, pet information, and a variety of other information traditionally printed on paper or plastic or stored on cards having a magnetic stripe or an optical bar code. Smart card technology has been particularly useful in banking systems and other financial transaction systems. For example, smart card technology has been used effectively in mass-transit systems where the stored value on a smart card is decreased by an amount equal to the fare each time the passenger uses the card to gain access to or exits from the mass-transit system. As described above, other information may be stored or modified on the card such as the time and location of transaction.

Although some smart card systems provide a method for owners to modify or read information on their smart card, these methods are limited in that the smart card communication interface required to perform the modification or other transaction is located in a public place. For example, in mass transit fare collection systems, the smart card owner can typically only add or check the value of the smart card at a smart card dispensing machine located at the mass transit terminal or gate. In other types of systems, the smart card owner may desire to make a purchase or engage in on line banking from the home or office using their smart card. Therefore, there is a need for a system and method that allows smart card owners to access or use their smart cards in locations other than public areas. Particularly, there is a need for system and method for checking or adding to the value of smart card from the customer premises or other convenient location.

Some systems have been suggested that include coupling a smart card to a laptop or personal computer (PC). These systems are limited in that they do not provide connectivity to a remote central computer system and require either the PC or the reader to perform security functions. This allows the security to be compromised since the security information is accessible in either the local processor or the smart card communication device. For example, many smart communication protocols require the use of security device such as a Security Access Module (SAM) that must be implemented in the PC or reader. Many security devices implement physical security protection such as automatic destruction techniques if an attempt is made to physically access the internal components. These techniques however, are not completely effective and security can be compromised. In addition, the transactions performed by the PC, laptop computer or the reader can be observed to determine security techniques used to communicate with the smart card.

An example of a suggested system discussed above, includes the system proposed in U.S. Pat. No. 5,664,157, issued to Takahira et al., which shows a laptop computer coupled to a smart card reader. This proposed system is limited in that the smart card is not coupled to a central computer system. Accordingly, the smart card cannot be used to make electronic purchases through a network. Further, since no connection is made with a central computer system that manages transactions, no value can be added to the smart card.

U.S. Pat. No. 5,623,637, issued to Jones et al., describes a host personal computer that couples a smart card reader to a remote computer. In this proposed system, the host computer must perform encryption and decryption functions to communicate with the smart card. This allows the security to be compromised since the security information is accessible.

In addition to the limitation described above, known systems require the modification of software, hardware or both within the computer or smart card communication device to enable communication with a smart card utilizing a new security function. Since effective communication is dependent upon either the smart card communication device or the computer performing security functions, one of the two devices must be modified if a new security function is implemented in a smart card.

Therefore, there is need for a smart card communication device, system and method for establishing a secure communication link between a smart card and a remote central computer system through a network.

SUMMARY OF THE INVENTION

In an embodiment of the invention, a secure communication link is established between a smart card and a central computer system. A security device coupled to the central computer system performs authentication of messages exchanged with the smart card. The smart card includes another security device that performs authentication of the exchanged messages. A smart card communication device modulates and demodulates data transmitted to and received from the smart card. The smart card communication device communicates to the central computer system through a communication network and a processor coupled to the communication network. In this exemplary embodiment, the network is an Internet network and the processor is a personal computer that is coupled to the smart card communication device through a data channel using an external port on the personal computer. Data is exchanged between the smart card and the central computer system with the use of a message authentication code which allows the detection of unauthorized modification of data in received messages.

One advantage of this embodiment is that the security device (implemented in hardware or software) necessary for authentication, decryption, or encryption is remotely located from the smart card communication device and is near the central computer system. Since the security devices can be maintained in a secure remote location, the system provides security that is not likely to be compromised.

Another advantage of this embodiment is that security devices at the central computer system may be replaced or exchanged without affecting the smart card communication device. The functionality of smart card communication device is not directly dependent on the type of security device needed to communicate with the present smart card.

Another advantage of the invention is that the need for additional encryption, decryption or authentication hardware or software at the customers premises is significantly reduced or eliminated. Secure data can be transmitted between the smart card and the central computer system without installing security software on the personal computer or adding security hardware.

Yet another advantage of the invention is that the security device can be implemented solely in software if the central computer system is considered to be secure. For example, security software can be run on a computer in a safeguarded location where access is restricted eliminating the need for a separate security device having a physical mechanism to provide security.

Therefore, this embodiment provides a smart card communication system, device, and method for establishing a secure communication link between a smart card and a central computer system through a communication network by allowing data to transparently pass through a smart card communication device, processor and communication network and by performing security functions at the smart card and the central computer system. This embodiment further enables a method of adding to or checking the value of a smart card from the convenience of the customer's home or office.

BRIEF DESCRIPTION OF THE DRAWINGS

The present invention will be better understood from the following detailed description of a first embodiment of the invention, taken in conjunction with the accompanying drawings in which like reference numerals refer to like parts and in which:

FIG. 5 is a drawing of an initial Web page displayed by the customer's Web browser in accordance with the first embodiment of the invention;

DESCRIPTION OF THE PREFERRED EMBODIMENT

Figure 1:
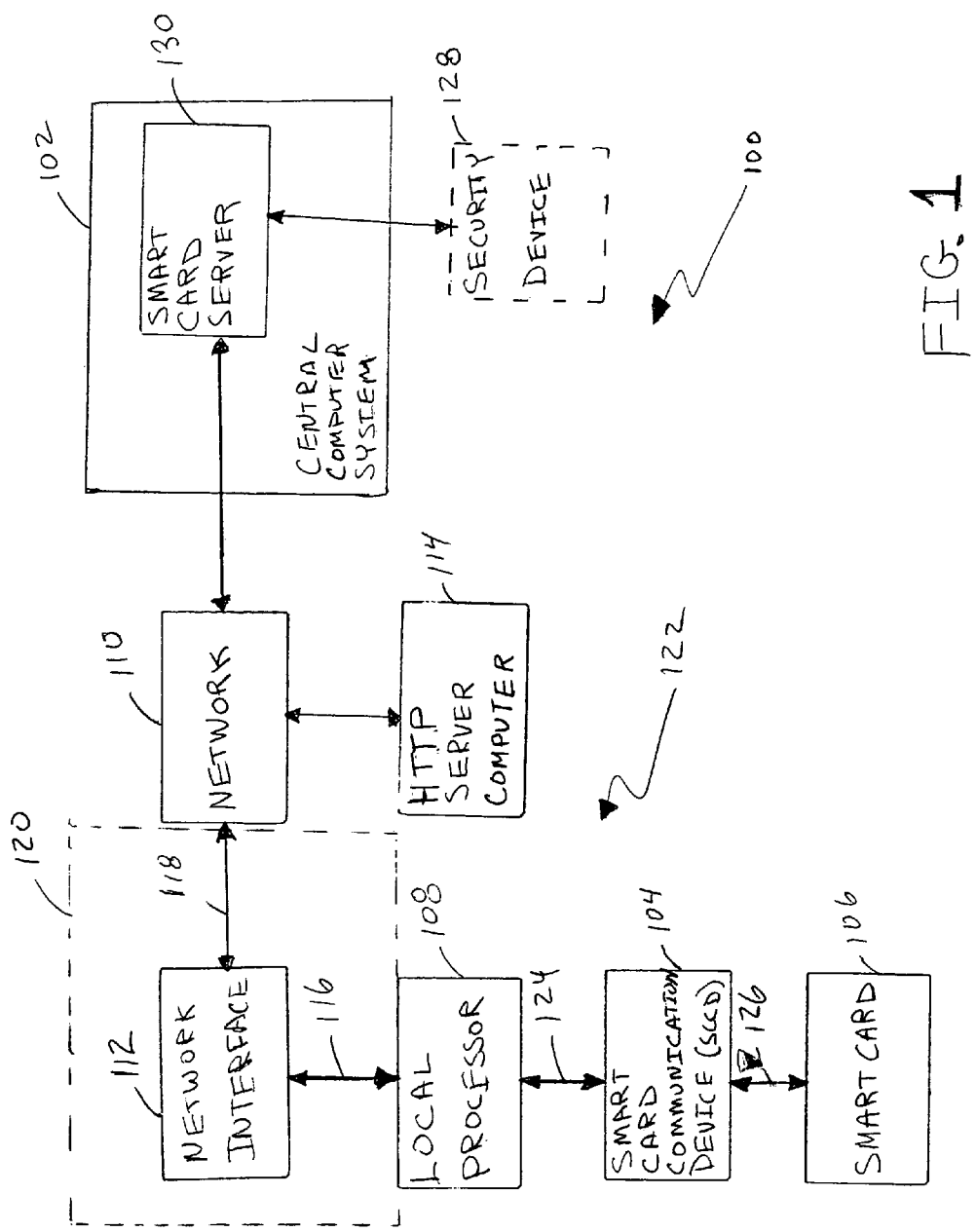
FIG. 1 is block diagram of a smart card communication system in accordance with a first embodiment of the invention.

A block diagram of a smart card communication system 100 in accordance with the first embodiment of the invention is shown in FIG. 1. The smart card communication system 100 includes at least a central computer system 102 coupled through a network 110 to a smart card communication device (SCCD) 104, a local processor 108 and a smart card 106. In the first embodiment, the local processor 108 is a standard personal computer (PC) (108) coupled through a network interface 112, such as a modem (112), to the Internet network (110). In other embodiments, the network 110 may be a Public Switched Telephone Network (PSTN), a Private Branch Exchange (PBX) system, cellular telephone system, Personal Communications Service (PCS) system, point to point microwave system, or any other wired, optical or wireless communication network or combination of networks suitable for transmitting data.

The local processor 108 is coupled to the SCCD 104 through a data channel 124 which, in the first embodiment, is a serial data channel implemented in accordance with the RS-232 standard. The local processor 108, however, may be any type of computer processor that includes a user interface and a means for coupling the SCCD 104 to the network 110 such as a laptop computer, a personal digital assistant (PDA) or set top cable box having an external port. The data channel 124 may be implemented using a variety of techniques. For example any one of several serial or parallel protocol standards may be used to transfer data between the SCCD 104 and the local processor 108 such as RS-422 or RS-485. Further, the data channel may be implemented in accordance with Universal Serial Bus (USB) techniques. Also, the data channel 124 may be implemented using wireless connections such as a radio frequency (RF), an infra-red (IR), or other optical or electro-magnetic link. As explained below, data transferred through the data channel 124 is in a secure state. Accordingly, using a wireless channel does not present any additional security issues.

The SCCD 104 exchanges data with the smart card 106 through a smart card channel 126. In the first embodiment, the smart card 106 is a proximity card and the smart card channel 126 is a radio frequency (RF) channel where information is modulated onto an RF carrier for transmission between the smart card 106 and the SCCD 104. As mentioned above, proximity cards employ modulated radio frequency (RF) field and impedance modulation techniques to transfer data between the proximity card and the SCCD 104. In the first embodiment, the protocol used to exchange data is in accordance with a smart card communication protocol defined by a system implemented by Cubic Transportation Systems (commercially referred to as the GO CARD® smart card system). This smart card communication protocol uses a 8% NRZ ASK (Non-return to Zero, Amplitude Shift Keying) modulation scheme for transmission from the smart card communication device 104 to the smart card 106 and an ASK-NRZ load modulation scheme for transmission from the smart card 106 to the SCCD 104. This smart card communication protocol is described in more detail in International Application Number PCT/US92/08892, titled "Non-contact Automatic Fare Collection System", filed Oct. 19, 1992, and published May 13, 1993 as WO93/09516. The PCT publication is incorporated by reference herein. Those skilled in the art will recognize that various other modulation techniques and protocols can be used to exchange data between the smart card 106 and the SCCD 104.

The network interface 112 is coupled to the local processor 108 through a data channel 116 and coupled to the network 110 through network compatible data channel 118. The network interface 112 provides a network channel 120 between the local processor 108 at the network 110 by translating and formatting data exchanged between the network 110 and the local processor 108. Although the network interface 112 is a modem coupled through a telephone network (118) to a smart card server 130 within the Internet in the first embodiment, those skilled in the art will recognize that various methods and devices can be used to couple the local processor 108 to the network 110. For example, various communication systems are currently available to provide Internet service through cable television networks or twisted pair wiring. These systems typically require a device at the customer premises for connecting a computer and other customer premise equipment to the communication system and the Internet. Accordingly, the invention can be utilized with any type of suitable network with appropriate hardware coupled to the network 110 to facilitate data communication. Further, although FIG. 1 illustrates a single branch link 122 to the smart card 106 from the network, the smart card communication system 100 includes a plurality of branches (122) to various customers coupled to the network 110.

As explained below in more detail, a hypertext transfer protocol (HTTP) server computer 114 is coupled through the network 110 to the central computer system 102 and the local processor 108 to provide hypertext markup language (HTML) services in the first embodiment. A persistent process running on the HTTP server computer 114 delivers HTML pages to a "Web browser" at the local processor 108. Preferably, the Web browser includes an HTTP client and Java virtual machine running on a Windows based system on the local processor 108.

The central computer system 102 can be a single computer such as PC or mainframe or a combination of computers. In the first embodiment, the central computer system 102 includes a smart card server 130. The smart card server 130 can be any type of computer or processor capable of providing the functionality described herein and, in the first embodiment, is a PC running Microsoft Windows NT.

A security device 128 coupled to the central computer system 102 provides the necessary security functions for establishing a secure communication link between the central computer system 102 and the smart card 106. The security device 128 is depicted using a dashed line in FIG. 1 to illustrate that the security device 128 may be part of the central computer system 120, the smart card sever 130, or may be externally coupled to the central computer system 102. The security device 128 may be an external physical security device, software running on a computer within the central compute system 102 or a combination of the two which provides the appropriate security functionality. Preferably, security software is not used exclusively if the computer running the software is not sufficiently secure.

In the first embodiment, the security function is an authentication function which allows the smart card or the smart card server to detect if the exchanged data includes an unauthorized modification. An unauthorized modification may either be an intentional fraudulent attempt to modify the message or data or may be caused be an error during transmission through the system 100. In other embodiments, the security function may include, either individually or in combination, encryption, decryption, authentication, access control, data confidentiality, data integrity, or non-repudiation techniques.

As discussed below in more detail, the local processor 108 accesses the HTTP server computer 114 through the network 110 using a Web browser. A Common Gateway Interface (CGI) program facilitates the exchange of data between the local processor 108 and a smart card server 130 within the central computer system 102 by providing the central computer system 102 with information needed to perform a transaction with a smart card 106. Application software is downloaded from the HTTP server computer 114 to provide the necessary functionality to the local processor 108 to allow data to be exchanged between the smart card server 130 the SCCD 104. The secure application software is, preferably, a small software application implemented in accordance with the Java computer language. These types of small software applications are referred to as "Java applets" in the industry and within this description. As discussed further below, the Java applets facilitate the execution of subroutines (commands) sent by the central computer system to the SCCD 104. The smart card provider server sends a series of commands through the network and the local processor 108 to the SCCD 104 to initiate communication with the smart card 106, read information from the smart card 106, write information to the smart card 106 and to end the transaction with the smart card 106.

Information (data) transmitted by the smart card 106 is secured with a security algorithm implemented within the smart card 106 and transmitted in a secure state through the SCCD 104, local processor 108, the network channel 120 and the network 110 to the central computer system 102. The security device 128 coupled to the central computer system 102, provides the necessary security functionality to establish a secure communication link between the central computer system 102 and the smart card 106. Information transmitted from the central computer system 102 is secured by the security device 128 and remains in a secure state until it is received by the smart card 106. In other words, the secure incoming data signals and the secure outgoing data signals are not deciphered, decoded or authenticated anywhere within the communication link except at the smart card 106 and the smart card server 130.

In the first embodiment, data is secured by utilizing message authentication codes appended to the data which allow the detection of a modification to the data and authentication of the senders identity but does not conceal the information contained in the data that is exchanged. Therefore, in the first embodiment, the data is authenticated but is not encrypted. In other embodiments, the security devices may provide both encryption and authentication or solely encryption of the data. Those skilled in the art will recognize that it may be advantageous to provide additional security procedures to protect sensitive data entered by the customer through the local processor 108 and transmitted through the network 110. For example and as discussed below, the customer provides credit card information through a transaction form that is transmitted to the smart card server 130 to pay for an added value to a smart card. The information entered by the customer and other information not generated by the smart card 106 is not necessarily in a secure state. The secure communication link is between the smart card 106 and the smart card server 130 and does not secure other information transmitted between the local processor 108 through the network 110. Using encryption techniques, the credit card information can be protected by providing security functionality to the link between the local processor 108 and the smart card server 130. Such encryption techniques are known in the art.

Although in the first embodiment the smart card 106 contains information relating to fare collection, the smart card 106 may exchange any one of several types of information with the smart card sever 130. In other embodiments, for example, the smart card 106 may contain medical information pertaining to a particular individual. The medical information may be updated after a medial procedure or test is performed. Also, prescription information may be contained in the smart card 106 allowing a pharmacy to supply the proper drug dosages for the authorized number of refills. The medical smart card 106 may include other types of medical information such as other medications prescribed to the patient or conditions of the patient that may interfere with the current prescription. After the prescription is filled, the pharmacist may deduct the number of available refills from the smart card 106 or add information to the smart card concerning the patient or prescription by establishing the secure link between the smart card 106 and the smart card server 108. The secure communication link reduces the possibility of fraudulent modifications of prescription. Those skilled in the art will recognize that the secure communication link and the smart card 106 can be used for a wide variety of uses not specifically described herein and may be particularly useful in applications where tampering with information on the smart card is a concern.

Figure 2:
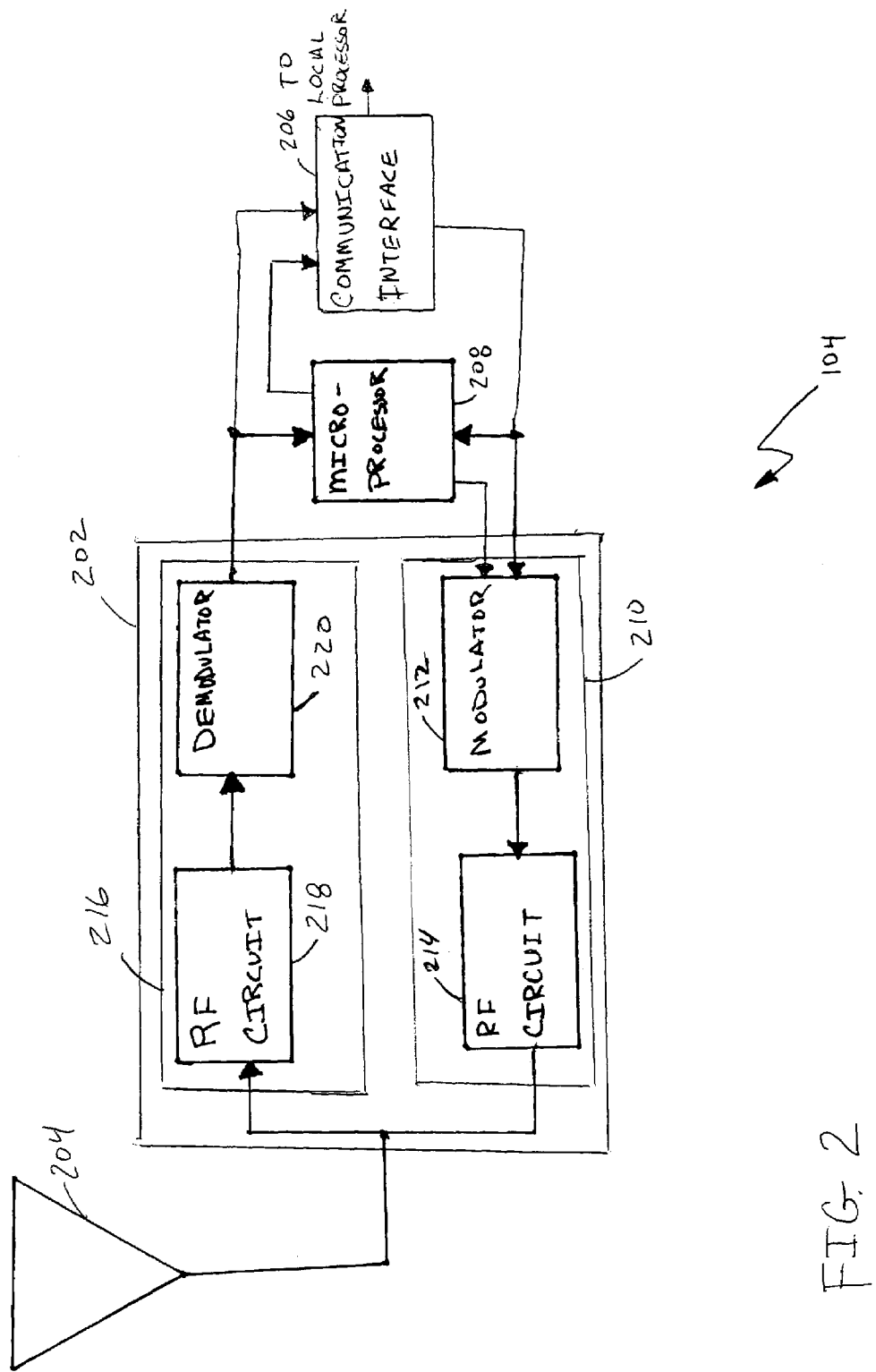
FIG. 2 is a block diagram of a smart card communication device (SCCD) in accordance with the first embodiment of the invention.

FIG. 2 is a block diagram of the smart card communication device (SCCD) 104 in accordance with the first embodiment of the invention. The SCCD 104 includes a transceiver 202 for exchanging data with the smart card 106 through an antenna 204, a communication interface 206 for communicating through the data channel 124, and a micro-processor 208 that facilitates the overall functionality of the SCCD 104. In the first embodiment, the communication interface includes discrete circuitry and logic gates designed to convert the logic signals transmitted and received through the transceiver to signals in accordance with the RS-232 standard. The communication interface 206, however, is designed in accordance with the particular data channel 124 and, in other embodiments, may be an optical transceiver or any other type of interface that couples the SCCD 104 to the data channel 124.

The micro-processor 208 is a PIC 16C54 micro-processor manufactured by the Microchip company in the first embodiment. Other processors, micro-controllers and logic circuitry, either singularly or in combination can be used to perform the functions of the micro-processor 208. The micro-processor 208 monitors messages and data transmitted from the local processor 108 through the data channel 124 through a Universal Asynchronous Receiver/Transmitter (UART) implemented within the micro-processor 208. If the micro-processor 208 detects an instruction message corresponding to an action that is to be performed by the micro-processor 208, the message is intercepted by the micro-processor 208 and the instructed action is performed. Otherwise, the message (secure incoming data) is allowed to continue through the transceiver 202 to the smart card 106. For example, if a message is sent instructing the SCCD 104 to perform a collision resolution process, the micro-processor 208 accesses the appropriate stored code and performs that process. If data is sent, the micro-processor 208 is not involved in the transaction and allows the data to pass to a transmitter 210 within the transceiver 202. Therefore, incoming data signals sent through the network 110 and received at the SCCD 114 are transparently modulated and transmitted to the smart card 106 without affecting, reading or deciphering the content of the signals in the first embodiment. In this way, no security devices or algorithms are necessary at the SCCD 104 or in the local processor 108 and the data is maintained in an undeciphered (authenticated) state between the smart card 106 and the central computer system 102.

It should be noted that the micro-processor 208 is not necessary to provide the secure communication link between the smart card 106 and the smart card server 130 and, in alternate embodiments, the SCCD 114 does not include a device that performs the function of the micro-processor 208 as described above. In the alternate embodiment, the communication system 100 and operates as described above except that no device within the SCCD 114 monitors the incoming data which is allowed to pass directly to the transceiver 202. This alternate embodiment may be particularly useful in system designed with the intent to reduce the size and cost of the SCCD 114 at the price of some functionality. Some features and functions may be eliminated or may be performed by the local processor 108. For example, in the alternate embodiment, collision resolution may be performed by the local processor 108 rather than the SCCD 114.

A transmitter 210 within the transceiver 202 includes a modulator 212 and a radio frequency (RF) circuit 214 for transmitting the data through the smart card channel 126. In the first embodiment, the modulator 212 varies the amplitude of a radio frequency carrier in accordance with the data content. The RF circuit 218 provides the necessary hardware for transmitting the data through the antenna 204. The secure incoming data signal is received through the data communication interface 206 as a sequence of logic "highs" and "lows" that is not intended to be understood, read or deciphered without the use of a security function. The transmitter 210, therefore, converts the incoming data signals from undeciphered (authenticated), secure baseband signals to radio frequency undeciphered (authenticated) secure signals.

As described above, the outgoing signals transmitted from the smart card 106 are received through the antenna 204 using impedance modulation techniques. A receiver 216 within the transceiver produces an outgoing data signal comprising a plurality of baseband logic "highs" and "lows" in accordance with the received secure outgoing data signals. In embodiments utilizing encryption techniques, the outgoing data signals correspond to intelligible information only when they are subjected to the proper security function. In other words, the sequence of "ones" and "zeros" of the secure outgoing data signal is not intended to be understood or deciphered without applying the proper security function to the sequence. In the first embodiment, the security functions do not prevent an eavesdropper from deciphering the data. Any modification attempts to fraudulently change the data will be detected when the message is received (either at the smart card 106 or the central computer system) since an eavesdropper will not have access to the message authentication codes and will not have the ability to create a proper message authentication code to produce an authentic re-transmitted and modified message.

In the first embodiment, therefore, the secure data signals include a plurality of logic highs and a plurality of logic lows corresponding to a verifiable authentic message only when subjected to the proper security function. The signals may be deciphered and received but cannot be verified to be authentic, un-modified, messages that have not been subjected to tampering or transmission errors without the use of the security function.

A radio frequency (RF) circuit 218 provides the necessary hardware to process the secure outgoing signals to the point where the demodulator can produce a serial data bit stream. The secure outgoing data signal is forwarded to the communication interface 206 for transmission to the local processor 108.

Although the RF circuits 214, 218, the modulator 212, and the demodulator 220 are illustrated as separate blocks within the transceiver, those skilled in the art will recognize that the various circuits can be combined in a variety of ways to produce the described functions. For example, the receiver 216 can be interpreted as a single circuit that performs the function of receiving and demodulating an RF signal to produce a digital bit stream. Those skilled in the art will further recognize that various additional circuitry may be needed to implement and couple the various functional blocks illustrated in FIG. 2.

Figure 3:
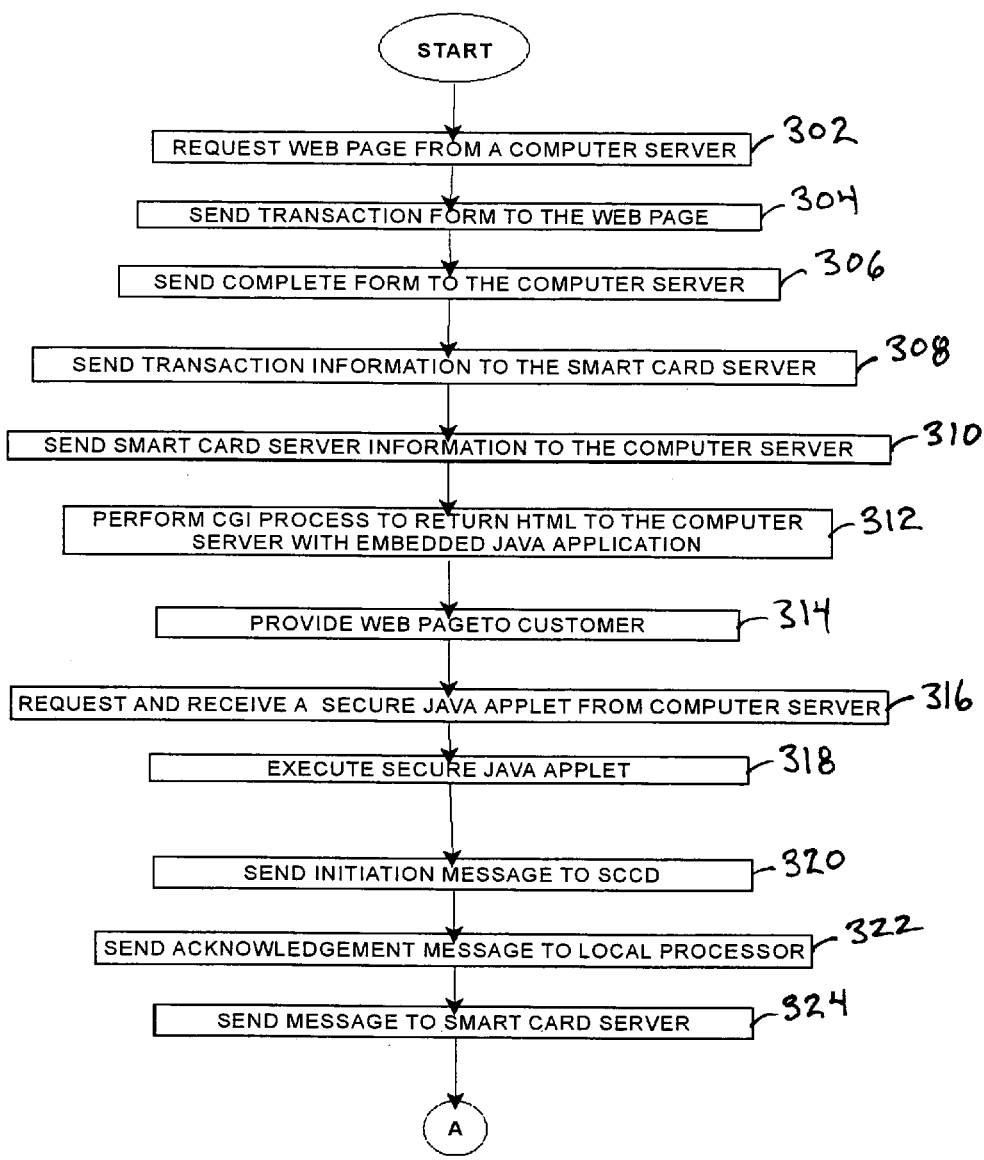
FIG. 3 is a first portion of a flow chart of a method of establishing a secure communication link between a smart card and a central computer system in accordance with the first embodiment of the invention.
Figure 4:
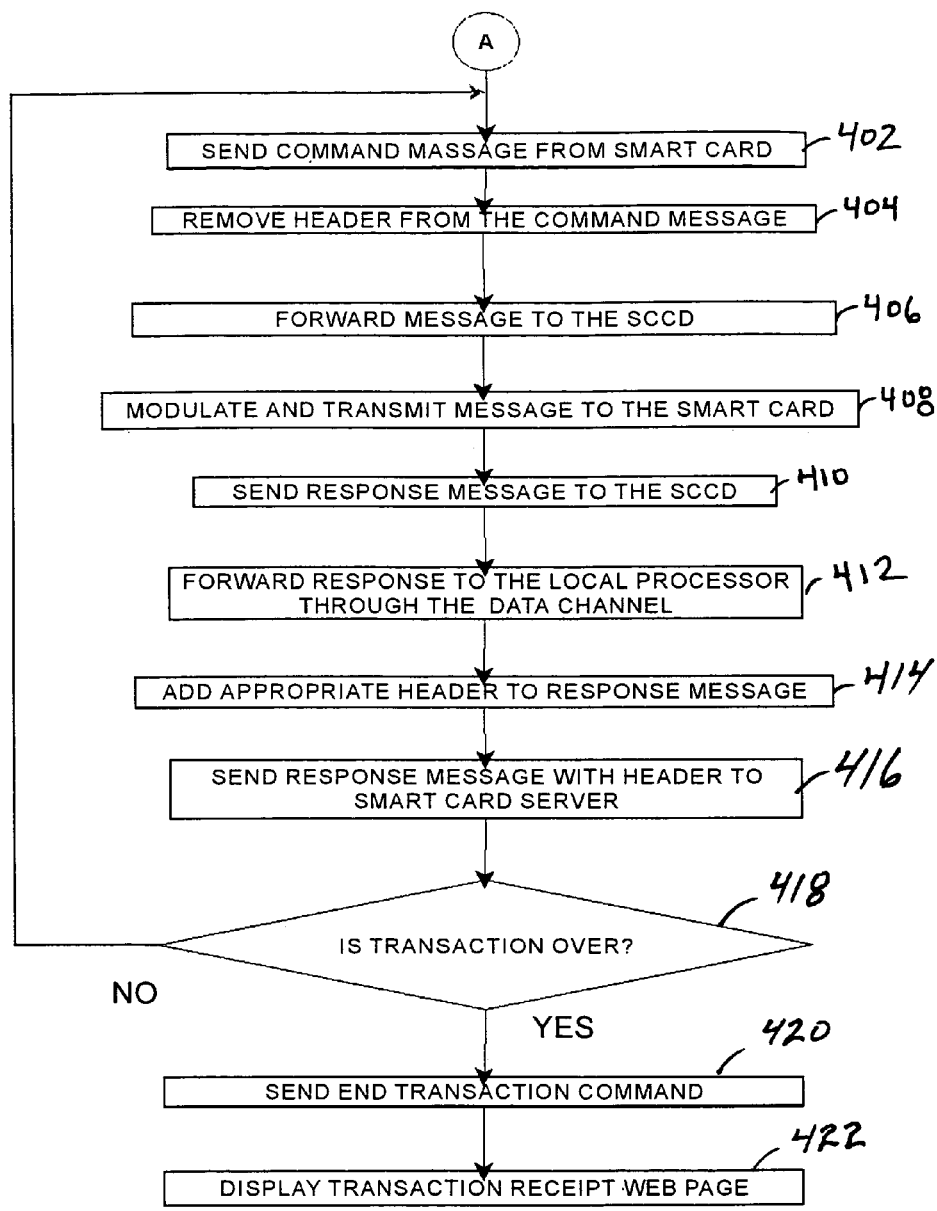
FIG. 4 is a block diagram of a second portion of the flow chart of the method of establishing the secure communication link between the smart card and the central computer system in accordance with the first embodiment of the invention.

FIG. 3 and FIG. 4 depict a flow chart of a method of establishing a secure communication link between a central computer system and a smart card to perform a secure smart card transaction. In order to begin a transaction process, a customer accesses the "Web page" of the smart card system provider using the Web browser on the local processor 108. At step 302, the Web browser requests a Web page from the HTTP server computer 114. In the first embodiment, the Web browser is software provided by the Microsoft Corporation and commercially referred to as the "Microsoft Internet Explorer" Web browser. Preferably, versions of 4.01 or greater are used in the first embodiment and the process for accessing the Web page is in accordance with known techniques.

After receiving the request for a Web page, the HTTP server computer 114 sends a transaction form to the local Web browser running on the local processor 108 at step 304. The Web page includes graphics and text conveying the various smart card functions that the customer can choose to perform. In the first embodiment, the Web page contains a request form that can be used to read and display the value contained on the customer's smart card 106 and to modify that value. The various user interface screens displayed on the display of the local processor 108, including the request form, are discussed in more detail in reference to FIGS. 5-8.

After the customer enters the appropriate information into the fields of the request form, the completed form is submitted to the HTTP server computer 114 by a post command at step 306. The post command initiates a Common Gateway Interface (CGI) process at the HTTP server computer 114. The data contained in the post command may include various types of information including the amount of money to add to the value of the card, type of credit card that will be used for the transaction, the charge number of the credit card, the credit card expiration date, and information indicating whether the transaction is a value request or a value increase transaction. As noted above, the information entered by the customer, such as credit card information, is not secure unless additional security is added to the system beyond the secure communication link between the smart card 106 and the smart card sever 130. Any one of several known techniques can be used to supply the additional security for the information entered by the customer.

The HTTP server computer 114 forwards the information contained in the post command to the central computer system 102 at step 308.

At step 310, the central computer system 102 returns smart card server information including such information as the Internet protocol (IP) address of the smart card server to the HTTP server computer 114 through the CGI process to the HTTP server computer. In the first embodiment, the smart card server information includes a data string representing the IP address of the customer's Web browser, a data string representing the port (socket) that should be used for communicating with the smart card server, and a data string representing an internal table index for the smart card server. The table index allows the smart card server 130 to keep track of the current secure transaction in order to ensure that the appropriate data is processed.

At step 312, the CGI process produces an HTML page with an embedded Java applets that is forwarded to the Web browser.

At step 314, the HTTP server computer 114 sends the Web page to the Web browser with an embedded link to a secure Java applet. At step 316, the Web browser requests and downloads the secure Java applet. Therefore, after the customer accesses the Web page, secure application software is downloaded to the local processor 108.

At step 318, the Web browser executes the Java applet on the Java virtual machine built into the Web browser. The executed application requests permission from the customer to access the physical hardware, such as the external ports, as is required by Java.

At step 320, the local processor 108 under the direction of the Java applet sends an initiation message to the SCCD 104. In order to verify that the SCCD 104 is connected to an external port of the local processor 108 and to initiate communications with the SCCD 104, the Java applet sends an initiation command through the data channel 124. The SCCD 104 "wakes up" from a sleep mode when the initiation command is received.

At step 322, the SCCD 104 sends an acknowledgment message to the Java applet in response to the initiation message to indicate that the SCCD 104 is connected and operating properly.

Using the information supplied by the central computer system 102, the Java applet sends a ready message to the smart card server 130 at step 324. This "ready" message includes the table index that the smart card server 130 uses to track the transaction. A purpose of this message is to indicate that a SCCD 104 has been located and is ready to begin a transaction.

Referring to FIG. 4, the smart card server sends a command message to the Java applet at step 402. Although, various types of command messages can be sent in other embodiments, the smart card server can send any one of four commands in the first embodiment including a wake-up command, a read command, a write command or an end transaction command. The commands are sent from the smart card server with an appropriate header indicating the type of command that is being sent.

After removing the header at step 404, the Java applet forwards the command to the SCCD 104 through the data channel 124 at step 406. In the first embodiment, the SCCD 104 retransmits the same data that is received from the Java applet. This method, however, does not preclude the SCCD 104 from responding to a particular command without retransmission to the smart card 106. Those skilled in the art will recognize the various methods and techniques of forwarding the command or data in light of the teachings herein. For example, a protocol can be used that allows the Java applet to generate and transmit a message command to the smart card based on a command received from the central computer system 102. Also, in other embodiments, if the header indicates that the SCCD 104 is to perform a particular action, the Java applet generates and sends an appropriate message to the SCCD 104 in accordance with the action. If the header does not indicate that an action should be performed by the SCCD 104, the incoming data is transmitted through the data channel 124 without effecting the data.

At step 408, the SCCD 104 modulates and transmits the command message as described above in reference to FIG. 2. In response, the smart card 106 sends a response message as a secure radio frequency outgoing signal to the SCCD 104 at step 410. In the first embodiment, the secure radio frequency outgoing data is the outgoing data with the appended message authentication code that is modulated onto a radio frequency carrier. The secure radio frequency outgoing data is secure in the sense that any unauthorized modification to the data will be detected with the use of the message authentication code. In other embodiments, the secure radio frequency outgoing data can be encrypted to conceal the outgoing data.

At step 412, the SCCD 104 receives and demodulates the secure radio frequency signal to produce a secure outgoing data signal which is forwarded to the local processor 108 through the data channel 124. As explained above, the secure outgoing data signals remain in a secure state and are not deciphered or authenticated by the SCCD 104.

The Java applet running on the Java virtual machine on the local processor 108 adds the appropriate header to the outgoing digital bit stream representing the outgoing data at step 414 before transmitting the outgoing response message (secure outgoing data signal) to the smart card server 130 through the network 102. The header indicates to the smart card sever 130 the type of message that is being sent.

At step 418, the smart card server 130 determines when the transaction is complete. If the transaction is not complete, the method returns to step 402 where the smart card server 130 sends a command message (secure incoming data signal). If the smart card server 130 determines that the transaction is over, the process continues at step 420.

At step 420, the smart card server sends an end transaction command message to the SCCD 104 through the local processor 108 and the network 110. After receiving the end transaction command message, the Java applet forwards the message to the SCCD 104. The end transaction message includes an instruction directing the SCCD 104 to go back into sleep mode.

At step 422, the Java applet displays a transaction receipt Web page through the display of the local processor 108. In other embodiments of the invention, a transaction receipt may be forwarded to a printer and printed.

FIG. 5 is a drawing of an example of an initial Web page 500 corresponding to an initial interface page in accordance with the first embodiment of the invention. The initial Web page 500 includes an identifier section 502, a welcome section 504, a necessary equipment section 506, instruction section 508 and a type of transaction section 510. The identifier section 502 indicates the smart card company that is providing the transaction service. The identifier section 502 is preferably located in a conspicuous location within the Web page such as at the top of the page. In addition to identifying the smart card provider, the identifier section 502 may identify a particular type of smart card 106 or service provided by the smart card provider.

The welcome section 506 includes a welcome statement to the customer and provides a short introduction to the type of services that can be performed by the customer.

Information regarding the type of equipment that is necessary to use the transaction service through the network 110 is included in the necessary equipment section 506. The necessary equipment section 506 may include other information regarding the equipment such as information regarding where the equipment can be purchased or obtained.

The instruction section 508 provides operating instructions to the customer and may include information such as how to handle the smart card, actions to take and diagnostic information.

The transaction section 510 provides the user interface for the customer to select the type of transaction desired. In the first embodiment, the customer may choose to perform either an add value transaction or a check values transaction and, therefore, the transaction section 510 includes virtual "buttons" identifying each of the possible transactions. The transaction section 510 may include other options in other embodiments such as an option to deduct value from a smart card 106.

Those skilled in art will recognize that the various sections 502-510 shown in FIG. 5 may be implemented and depicted in the initial Web page in various ways using a variety of text, font, lines and figures. In other embodiments, the initial Web page 500 may be complimented or replaced by an audible message.

Figure 6:
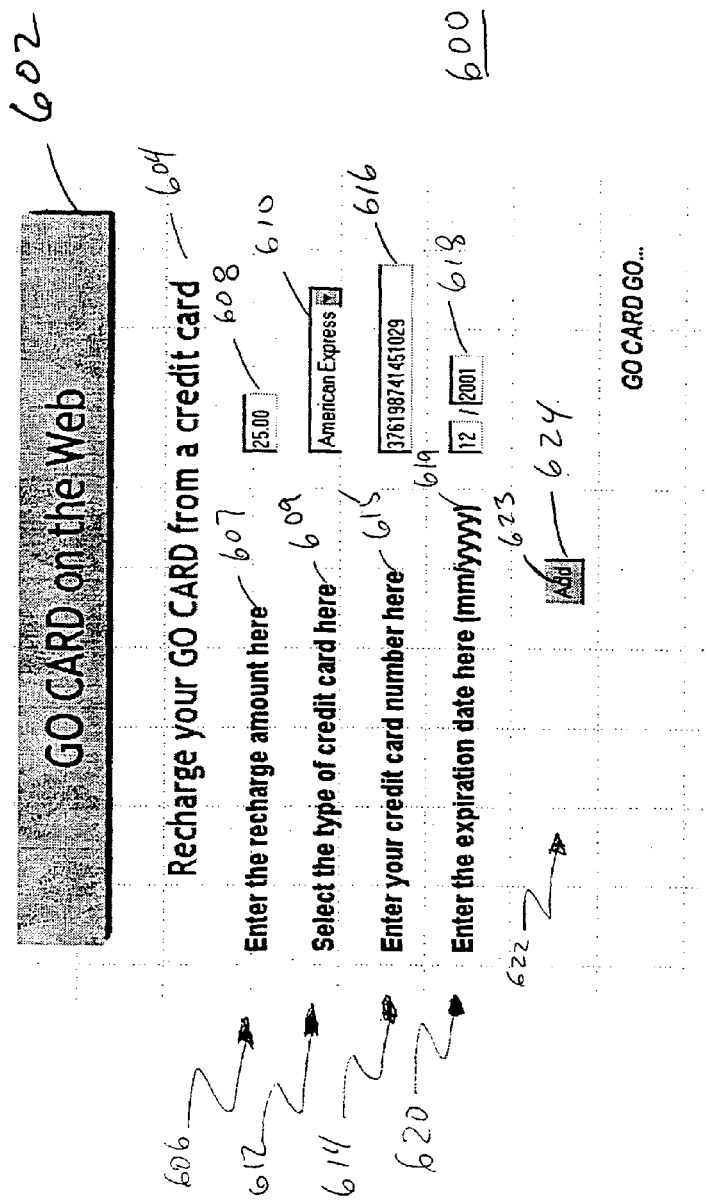
FIG. 6 is a drawing of a transaction form Web page displayed by the customer's Web browser in accordance with the first embodiment of the invention.
Figure 7:
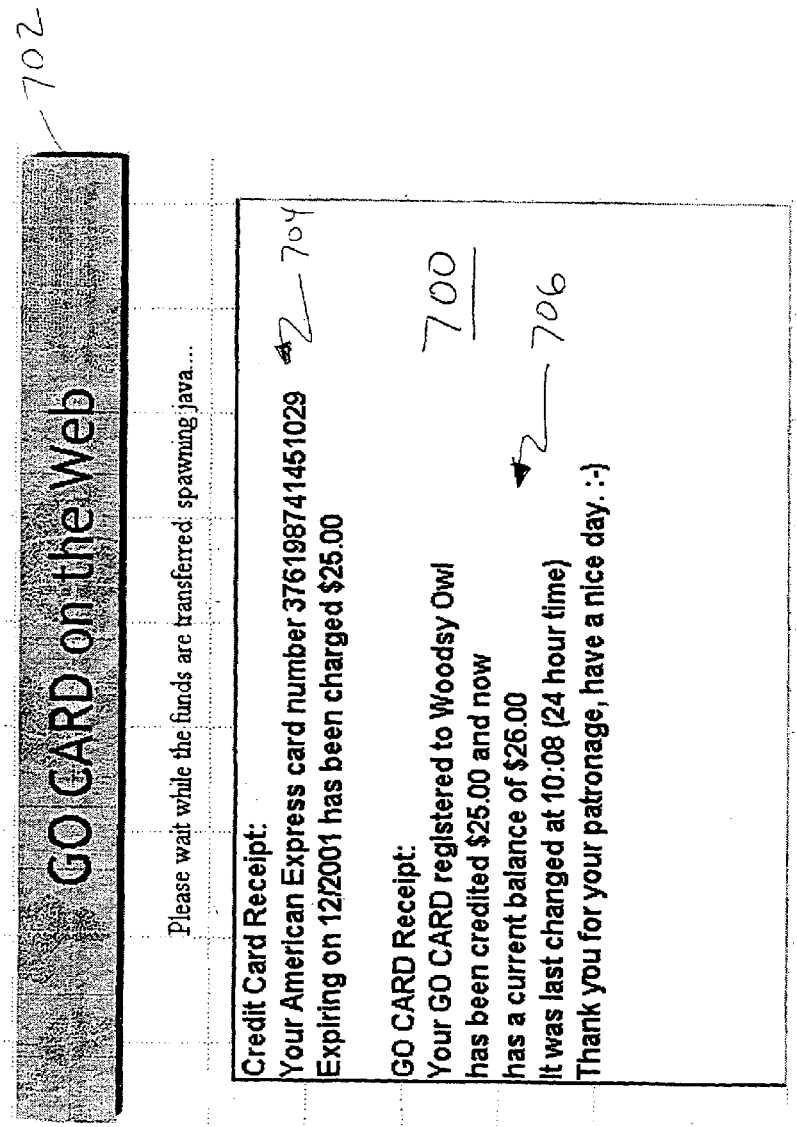
FIG. 7 is a drawing of an exemplary receipt Web page displayed by the customer's Web browser in accordance with the first embodiment of the invention.

FIG. 6 is an example of a transaction form Web page 600 in accordance with the first embodiment of the invention. An identification section 602 contains information indicated the smart card provider that is proving the transaction service. Although the identification section 602 in the transaction form Web page 600 is the same as the identification section 502 in the initial Web page 500, the identification section 602 may include different or additional information. A service identification section 604 provides information regarding the type of transaction that will be performed.

A value section 606 includes text 607 identifying the section and a value field 608. The customer enters the desired value that should be added to the smart card 106 in the value field 608.

The type of credit card that the customer wishes to be charged for the added value is indicated in a credit card type field 610 within in a credit card type section 612. The credit card type section 612 also includes text 609 instructing the customer to enter the type of credit card. In the first embodiment, the credit card type field 610 includes a "pull-down" menu in order to indicate the types of credit cards that can be used and to provide convenience to the customer.

A credit card number section 614 includes a credit card number field 616 in addition to text 615 indicting that the customer should enter the credit card number. The text 615 may also indicate the required format of the credit card number such as indicating that no spaces or dashes should be used.

The credit card expiration data is entered in an expiration date field 618 within an expiration date section 620. The expiration date section 620 also includes text 619 identifying the section 620.

A submit transaction section 622 includes an add button 624 that is selected by the customer to submit the transaction to the smart card server 130. Text 623 indicating the function of the add "button" is displayed within the add button 624 in the first embodiment. Therefore, after the customer has entered the required information as instructed by text 607, 609, 615, 619 within the corresponding section 606, 612, 614, 620, the customer clicks on the add button to submit the information to the HTTP server computer 114. As described above, a CGI process running on the HTTP server computer 114 initiates the sequence allowing the smart card server to perform the requested transaction in accordance with the information submitted by the customer in the transaction form Web page. Those skilled in art will recognize that the various sections 602-624 shown in FIG. 6 may be implemented and depicted in the Web page 600 in various ways using a variety of text, font, lines and figures. In other embodiments, the Web page 600 may be complimented or replaced by an audible message.

Upon either the successful completion or failure of the transaction, a receipt Web page is displayed. An example of a receipt Web page 700 is show in FIG. 7. In the first embodiment, the receipt Web page includes a identification section 702, a credit card receipt section 704, and a smart card receipt section 706. The identification section 702 includes information identifying the smart card provider and is the same as identification sections 502, 602 in other Web pages in the first embodiment.

The credit card receipt section 704 includes information regarding the type of credit card, the credit card number, the expiration data and the value charged to the credit card.

The smart card receipt section 706 includes text indicating the name of the smart card 106 owner, the amount added to the smart card 106, the current value on the smart card 106 (including the added value) and the time of the last transaction involving the smart card 106.

A customer, therefore, can check or add to the value on a smart card 106 by placing the card on the SCCD 104, accessing the smart card provider Web page on the Internet and submitting information to the smart card server 130 through the Internet network 110. A secure communication link is established and maintained between the smart card 106 and the smart card server 130 through the network 110. The SCCD 104 demodulates outgoing secure radio frequency signals transmitted from the smart card 106 to produce secure outgoing data signals. The Java applet running on the local processor 108 formats the outgoing data signals in accordance with Internet Protocol (IP) and sends the formatted outgoing data signals to the smart card server 130 in the central computer system 102. Incoming signals sent from the smart card server 130 are sent through the network 110 in accordance with IP signaling to the local processor 108. The Java applet running on the local processor 108 removes any headers on the IP formatted incoming data signal to produce the secure incoming data signal that is transmitted through the data channel 124 to the SCCD 104. The SCCD 104 modulates the secure incoming data signal to produce a secure incoming radio frequency signal that is transmitted through the smart card channel 126 to the smart card 106. Since security (authentication) functions are only performed at the smart card 106 and the smart card server 130, a secure communication link is maintained which is less likely to be compromised than communication links of prior art systems. The exchanged data is maintained in an unmodified secure (authentic) state between the smart card 106 and the smart card server 130. Unauthorized value changes are minimized while the cost of customer premise equipment required to perform a smart card transaction from the customer premises is reduced. Further, security methods can be changed without the need for modifications of the customer premise equipment such as the SCCD 104.

Other embodiments and modifications of the present invention will occur readily to those of ordinary skill in the art in view of these teachings. Such persons will appreciate the symmetries among the various embodiments illustrated above and understand that their elements may be arranged in other ways to produce similar results. For example, various combinations of encryption, authentication and other security functions may be utilized to provide the secure communication link between the smart card and the central computer system. Therefore, this invention is to be limited only by the following claims, which include all such other embodiments and modifications when viewed in conjunction with the above specification and accompanying drawings.

We claim:

1. A method of establishing a secure communication link between a smart card and a central computer system through a communication network, the method comprising the steps of:

receiving at a smart card communication device an outgoing secure radio frequency signal transmitted from the smart card, the secure radio frequency signal including secured data formatted by the smart card to allow the central computer system to detect a modification to the secured data occurring during transmission beginning at the smart card and extending to the central computer system;

demodulating the outgoing secure radio frequency signal using the smart card communication device to produce an outgoing secure data signal, wherein the demodulating of the outgoing secure radio frequency signal is without deciphering the secured data;

formatting the outgoing secure data signal in accordance with a communication network protocol to produce an outgoing formatted secure signal;

transmitting the outgoing formatted secure signal to the central computer system, wherein the central computer system is remote from the smart card communication device;

decoding, using a security device coupled to the central computer system, data from the outgoing formatted secure signal to detect the modification to the secured data occurring during transmission beginning at the smart card and extending to the central computer system;

processing, with the central computer system, a transaction for the smart card using the secured data included in the outgoing formatted secure signal; and encoding central computer system information using the security device to produce an incoming secure data signal comprising an incoming set of secured data, the incoming set formatted to allow the smart card to detect a modification to the incoming set occurring during transmission beginning at the central computer system and extending to the smart card.

2. A method in accordance with claim 1 further comprising the step of subjecting outgoing secure data contained within the outgoing secure radio frequency signal to a security function only at the smart card and at the central computer system.

3. A method in accordance with claim 1 further comprising the step of reformatting, at the central computer system, the outgoing formatted secure signal to produce the outgoing secure data signal, the outgoing secure data signal comprising the secured data, wherein the step of decoding further comprises decoding the outgoing secure data signal to receive smart card information included within the outgoing secure data signal.

4. A method in accordance with claim 3 further comprising the steps of:
   receiving an incoming secure formatted signal from the central computer system at the smart card communication device through the communication network, the incoming secure formatted signal formatted in accordance with the communication network protocol;
   reformatting the incoming secure formatted signal using the smart card communication device to produce an incoming secure data signal; and
   transmitting an incoming secure radio frequency signal from the smart card communication device to the smart card, wherein the incoming secure radio frequency signal is modulated in accordance with the incoming secure data signal.

5. A method in accordance with claim 4 further comprising the steps of:
   demodulating the incoming secure radio frequency signal within the smart card to produce the incoming secure data signal; and
   decoding the incoming secure data signal to receive central computer information included within the incoming secure data signal.

6. A method in accordance with claim 5 wherein the step of decoding the outgoing secure data signal comprises the step of implementing a security function using a security device remote from the smart card communication device and coupled to the central computer system to decode the outgoing secure data signal.

7. A method in accordance with claim 6 further comprising the step of encoding outgoing data within the smart card using a security function to produce the outgoing secure data signal.

8. A method in accordance with claim 6 wherein the step of encoding further comprises the steps of:
   generating a message authentication code at the smart card; and
   appending the message authentication code to the outgoing data.

9. A method in accordance with claim 8, wherein the step of decoding comprises the step of observing a characteristic of the outgoing data in accordance with the message authentication code.

10. A method in accordance with claim 9, wherein the step of observing comprises the step of:
    generating the message authentication code at the central computer system; and
    comparing the secure outgoing data signal to the message authentication code to detect the modification to the secured data.

11. A method in accordance with claim 9 wherein the step of decoding the incoming secure data signal comprises the step of decoding the incoming secure data signal within the smart card using a security function.

12. A method in accordance with claim 11 wherein the step of encoding further comprises the steps of:
    generating a message authentication code at the central computer system; and
    appending the message authentication code to the incoming data.

13. A method in accordance with claim 12, wherein the step of decoding the incoming secure data signal comprises the step of observing a characteristic of the incoming secure data signal in accordance with the message authentication code.

14. A method in accordance with claim 13, wherein the step of observing comprises the step of:
    generating the message authentication code at the smart card; and
    comparing the secure incoming data signal to the message authentication code to detect an unauthorized modification of the incoming data.

15. A method in accordance with claim 1 wherein the secured data is formatted to allow the central computer system to authenticate identity of the sender.

16. A method of establishing a secure communication link between a smart card and a central computer system through a communication network, the method comprising the steps of:
    encoding, using the smart card, information within the smart card using a security function to produce an outgoing secure data signal comprising a first set of secured data, the first set formatted to allow the central computer system to detect a modification to the first set occurring during transmission beginning at the smart card and extending to the central computer system;
    transmitting an outgoing secure radio frequency signal including the outgoing secure data signal to a smart card communication device;
    demodulating an outgoing secure radio frequency signal at the smart card communication device to produce the outgoing secure data signal;
    formatting the outgoing secure data signal in accordance with a communication network protocol to produce an outgoing formatted secure signal;
    transmitting the outgoing formatted secure signal to the central computer system through a communication network, the central computer system located remotely from the smart card communication device;
    reformatting the outgoing formatted secure signal to produce the outgoing secure data signal; and
    decoding, using a security device coupled to the central computer system, the outgoing secure data signal to receive the smart card information and to detect whether the modification to the first set occurred during transmission beginning at the smart card and extending to the central computer system;
    processing, using the central computer system, a transaction for the smart card using the decoded smart card information;
    encoding central computer system information using the security device to produce an incoming secure data signal comprising a second set of secured data, the second set formatted to allow the smart card to detect a modification to the second set occurring during transmission beginning at the central computer system and extending to the smart card;
    formatting the incoming secure data signal to produce an incoming secure formatted signal;
    receiving the incoming secure formatted signal from the central computer system through the communication network, the incoming secure formatted signal formatted in accordance with the communication network protocol;
    reformatting the incoming secure formatted signal to produce the incoming secure data signal; and transmitting an incoming secure radio frequency signal to the smart card, wherein the incoming secure radio frequency signal is modulated in accordance with the incoming secure data signal;

demodulating the incoming secure radio frequency signal within the smart card to produce the incoming secure data signal; and decoding the incoming secure data signal using a security function within the smart card to receive the central computer information at the smart card and to detect whether the modification to the second set occurred during transmission beginning at the central computer system and extending to the smart card.

17. A method of establishing a secure communication link between a smart card and a central computer system remotely located from the smart card, the method comprising the steps of:

exchanging secure data through a radio frequency communication channel from a smart card communication device to the smart card;

exchanging the secure data through a communication network from the central computer system to the smart card communication device;

performing a security function at the smart card on a first set of the secure data received from and encoded by a security device at the central computer system for transmission to the smart card, the security function at the smart card performed to detect whether a modification to the first set of the secure data occurred during transmission beginning at the central computer system and extending to the smart card;

performing the security function on the secure data using the security device at the central computer system to encode the first set of the secure data to allow the smart card to detect a modification to the first set of the secure data occurring during transmission beginning at the central computer system and extending to the smart card;

decoding, using the security device, data transmitted from the smart card to detect a modification to a second set of the secure data occurring during transmission beginning at the smart card and extending to the central computer system; and processing, using the central computer system, a transaction for the smart card using the secure data.

18. A method in accordance with claim 17 wherein the step of exchanging the secure data through the communication network comprises the steps of:

formatting secure data in accordance with a communication network protocol;

transmitting the secure data through the communication network;

and reformatting the secure data.

19. A method of establishing a secure communication link between a smart card and a central computer system remotely located from the smart card, the method comprising the steps of:

downloading communication link interface software to a processor local to a smart card communication device from a HTTP server in a remote computer system;

exchanging secure data between the smart card and the smart card communication device through a radio frequency communication channel;

exchanging the secure data between the smart card communication device and the central computer system through the processor running the downloaded communication link interface software, wherein the processor is coupled to the central computer system through a communication network and the processor is located remotely from the central computer system;

decoding, using a security device coupled to the central computer system, a first set of the secure data received through the communication network to detect whether modification to the first set occurred during transmission beginning at the smart card and extending to the central computer system;

processing, using the central computer system, a transaction for the smart card using the secure data; and encoding central computer system information using the security device to produce a second set of the secure data, the second set formatted to allow the smart card to detect a modification to the incoming set occurring during transmission beginning at the central computer system and extending to the smart card.

20. A method of establishing a secure communication link between a smart card and a central computer system remotely located from the smart card communication device, the method comprising the steps of:

exchanging secure data with a smart card communication device through a baseband data channel, wherein the secure data comprises data exchanged between the smart card communication device and the smart card through a radio frequency channel;

formatting the secure data at the smart card communication device in accordance with a communication network protocol;

exchanging the secure data between the smart card communication device and the central computer system through a communication network, wherein a first set of the secure data is formatted by the smart card to allow the central computer system to detect a modification to the secure data occurring during transmission beginning at the smart card and extending to the central computer system;

decoding, using a security device coupled to the central computer system, a first set of the secure data received through the communication network to detect whether modification to the first set occurred during transmission beginning at the smart card and extending to the central computer system, processing, using the central computer system, a transaction for the smart card using the secure data; and encoding central computer system information using the security device to produce a second set of secured data, the second set formatted to allow the smart card to detect a modification to the second set occurring during transmission beginning at the central computer system and extending to the smart card.

21. A method in accordance with claim 20 wherein the secure data is not deciphered within the communication link.

22. A method in accordance with claim 20 further comprising the step of subjecting the secure data to a security function only at the smart card and at the central computer system.

23. A smart card communication system for establishing a secure communication link between a smart card and a central computer system, the smart card communication system comprising:

a smart card communication device comprising a radio frequency transceiver adapted to exchange secure data with the smart card through a radio frequency communication channel and a data communication interface;

a processor coupled to the smart card communication device, the processor adapted to exchange the secure data with the data communication interface through a baseband data channel;

a communication network coupled to the processor and adapted to exchange the secure data in accordance with a communication network protocol between the processor and the central computer system located remotely from the processor;

a security device coupled to the central computer system and configured to:

decode a first subset of the secure data received through the communication network to detect whether modification to the first set occurred during transmission beginning at the smart card and extending to the central computer system; and encode central computer system information to produce a second set of the secure data, the second set of the secure data formatted to allow the smart card to detect a modification to the secure data occurring during transmission beginning at the central computer system and extending to the smart card, the security device located remotely from the processor; and a smart card adapted to receive the second set of the secure data and detect whether a modification to the secure data occurred during transmission beginning at the central computer system and extending to the smart card.

24. A system in accordance with claim 23 wherein the communication network is an Internet network and the communication network protocol is an Internet protocol.

25. A system in accordance with claim 23 further comprising a smart card adapted to subject outgoing data to a security function to produce a secure outgoing data signal.

26. A smart card communication system including a smart card communication device having a local processor coupled to a remotely located central computer system through a communication network, the system comprising:

a smart card communication device comprising:

a radio frequency transceiver adapted to exchange secure data with a smart card through a radio frequency communication channel; and a data communication interface adapted to exchange the secure data with the processor through a baseband data communication channel without deciphering the secure data; and the central computer system coupled to a security device configured to:

decode a first set of the secure data received through the communication network to detect whether modification to the first set occurred during transmission beginning at the smart card and extending to the central computer system; and encode central computer system information to produce a second set of the secure data, the second set of the secure data formatted to allow the smart card to detect a modification to the secure data occurring during transmission beginning at the central computer system and extending to the smart card, the security device located remotely from the processor.

27. A system in accordance with claim 26 wherein the transceiver comprises:

a receiver adapted to receiving a secure outgoing radio frequency signal from a smart card to produce a secure outgoing data signal, the data communication interface adapted to send the outgoing data signal including the first set through the baseband data channel in a secure state.

28. A system in accordance with claim 27 wherein the receiver comprises a demodulator adapted to demodulate the secure outgoing radio frequency signal to produce the secure outgoing data signal, the secure outgoing data signal comprising a plurality of logic highs and a plurality of logic lows corresponding to an intelligible message only when subjected to a security function.

29. A system in accordance with claim 27 wherein the receiver comprises a demodulator adapted to demodulate the secure outgoing radio frequency signal to produce the secure outgoing data signal, the secure outgoing data signal comprising a plurality of logic highs and a plurality of logic lows corresponding to a verifiable authentic message only when subjected to a security function.

30. A system in accordance with claim 26 wherein the transceiver comprises a transmitter adapted to transmit a secure incoming radio frequency signal to the smart card, the secure incoming radio frequency signal based on a secure incoming data signal including the second set received by the data communication interface.

31. A system in accordance with claim 30, wherein the transmitter comprises a modulator adapted to modulate the secure incoming data signal to produce the secure incoming radio frequency signal, the secure incoming data signal comprising a plurality of logic highs and plurality of logic lows corresponding to an intelligible message when subjected to a security function.

32. A system in accordance with claim 30, wherein the transmitter comprises a modulator adapted to modulate the secure incoming data signal to produce the secure incoming radio frequency signal, the secure incoming data signal comprising a plurality of logic highs and plurality of logic lows corresponding to a verifiable authentic message only when subjected to a security function.

* * * * *

UNITED STATES PATENT AND TRADEMARK OFFICE
CERTIFICATE OF CORRECTION

PATENT NO. : 7,437,560 B1  
APPLICATION NO. : 09/360068  
DATED : October 14, 2008  
INVENTOR(S) : Kevin J. Page et al.

Page 1 of 1

It is certified that error appears in the above-identified patent and that said Letters Patent is hereby corrected as shown below:

At Column 19, line 8, delete "sub" before "set".

Signed and Sealed this

Eighteenth Day of November, 2008

JON W. DUDAS  
*Director of the United States Patent and Trademark Office*